United States Patent

[11] 3,587,634

[72] Inventor: Walter Krause, Eschborn Taunus, Germany
[21] Appl. No.: 883,151
[22] Filed: Dec. 8, 1969
[45] Patented: June 28, 1971
[73] Assignee: Phönix Armaturenwerke Bregel GmbH, Frankfurt Am Main, Germany
[32] Priority: Dec. 7, 1968, May 22, 1969
[33] Germany
[31] G 6810333.3 and G 6920579.4

[54] FILL AND DISCHARGE VALVE WITH MANUAL OPERATION
11 Claims, 2 Drawing Figs.

[52] U.S. Cl. ............... 137/553, 137/614.11, 137/614.19, 137/522
[51] Int. Cl. .......................... F16k 31/44, F16k 35/00
[50] Field of Search ........................ 137/522, 523, 553, 614.19, 614.11; 251/14, 285

[56] References Cited
UNITED STATES PATENTS

| | | | |
|---|---|---|---|
| 1,974,071 | 9/1934 | Kimball | 137/614.19 |
| 2,938,530 | 5/1960 | Matter | 137/614.11 |
| 2,970,609 | 2/1961 | Beremand | 137/614.19 |
| 3,173,448 | 3/1965 | Jones | 137/614.19 |
| 3,347,271 | 10/1967 | Ellerbusch | 251/285 |

Primary Examiner—Laverne D. Geiger
Assistant Examiner—William H. Wright
Attorney—Waters, Roditi, Schwartz & Nissen ABSTRACT: A vessel for corrosive substances or the like has a valve construction constituted by a fill and discharge valve adapted for being opened and closed by a pressure fluid, and a normally closed back pressure valve which is opened by the fill and discharge valve when the latter is opened to permit filling or emptying the vessel. A manually operated spindle nut is threaded on a stem of the fill and discharge valve and the spindle nut is displaceable between two limit positions. In a first position the stem is secured and locked and opening of the fill and discharge valve is prevented. When the nut is out of the first position the fill and discharge valve can be operated by the pressure fluid, and when the nut is turned in the second position the stem is displaced and the fill and discharge valve is opened without the supply of the pressure fluid.

FILL AND DISCHARGE VALVE WITH MANUAL OPERATION

BRIEF SUMMARY OF THE INVENTION

The invention relates to a fill and discharge valve for use with tank cars which convey dangerous, poisonous and corrosive substances. The fill and discharge valve according to this invention is operated in known manner automatically, by means of compressed air for example, and the apparatus is characterized by having an auxiliary manual control which fulfills a double function, to wit: it locks the valve when the tank is full, especially during rough travel of the tank car, and it allows the valve to be opened and shut without compressed air.

The valve according to the present invention additionally has a back pressure valve. According to one embodiment of the invention, the back pressure valve includes a spherical valve component.

The back pressure valve has the function that if the full and discharge valve is broken from the dome of the fuel tank by accident, the back pressure valve prevents the contents of the tank from escaping and causing damage.

The invention contemplates a novel fill and discharge valve with a manual control and having a back pressure valve in the form of a conventional ball valve or of a ball retaining valve.

Back pressure valves with a ball resting loosely in their feed pipe are known. If the fill and discharge valve is wrenched off or becomes leaky due to accident, an adequate discharge velocity has to be built up before this ball closes in front of the valve seat. Until that happens, however, the corrosive or toxic fluids can already have escaped in considerable volume, so that these known back pressure valves do not provide adequate safety.

Tank car valves of various designs are known. In some countries such valves for the transit of dangerous liquids, e.g. liquid chlorine must be provided with a further back pressure valve in addition to the specific fill and discharge valve.

Such fill and discharge valves are in general controlled by compressed air, for example at about 6 atmospheres gauge pressure. They are also dependent on the availability and proper working of a compressed air plant at the discharge site. If such compressed air equipment is not available or is out of order, such valves are useless. This is a considerable disadvantage of such fill and discharge valves.

A further disadvantage is the fact that such automatic valves can become temporarily leaky during the tank car journey, namely from vibrations and joltings of the wheels. These automatic valves wobble and chatter and release small amounts of the contents of the tank up to the blind flange. This, however, is something that must definitely be avoided at all costs, especially with toxic or corrosive substances.

Back pressure valves combined with fill and discharge valves are in general of the cone nonreturn type. Compression springs urge these valves to the closed position. When the fill and discharge valve is operated, by compressed air for example, the back pressure value opens automatically at the same time. The present invention pertains accordingly to a novel combination of a fill and discharge valve with auxiliary hand operation and a conventional cone nonreturn valve.

Cone nonreturn valves present, however, certain disadvantages. They are of comparatively complicated construction and therefore can give rise to blockages. Several materials, such as metal and plastic are required in their manufacture. The stem of such a cone nonreturn valve is subject to fairly intensive friction, so that the spring of the valve has to be correspondingly strong.

The present invention avoids the disadvantages of the conventional fill and discharge valves as well as those of the conventional combination of a fill and discharge valve and a back pressure valve.

An object of the invention is to provide a fill and discharge valve which, if the occasion arises, is independent of the availability or operation of a compressed air installation.

A further object of the invention is to provide a fill and discharge valve which is safeguarded from leakage particularly during the travel of the vessel on which the valve is installed.

A further object of the invention is to provide a fill and discharge valve in association with a back pressure valve which is of simple construction and is not inclined to blockages.

All these objects are achieved according to the invention by a fill and discharge valve including a manually operated control mounted externally of a cap of a valve cylinder and engaging a spindle nut on a screw thread at an outward extremity of a valve stem. Suitable adjustment of the spindle nut makes it possible to block the valve stem, that is, to lock the fill and discharge valve in a particular position. On the other hand, it is possible to move the valve stem backward or forward by operation of this spindle nut and in this way to open or close the valve manually.

The back pressure valve combined with this fill and discharge valve with manual operation can be a cone nonreturn valve. According to a preferred embodiment of the invention the back pressure valve however is a ball retaining valve, that is, the valve component consists of a ball subjected to spring loading and forced against a valve seat, and on the opening of the fill and discharge valve it is automatically lifted from its valve seat by the valve stem. A ball retaining valve is of simple construction and is less susceptible to trouble while also being less expensive than a cone nonreturn valve. Moreover, its fitting, dismantling and cleaning are also simpler.

DETAILED DESCRIPTION

Figure 1:
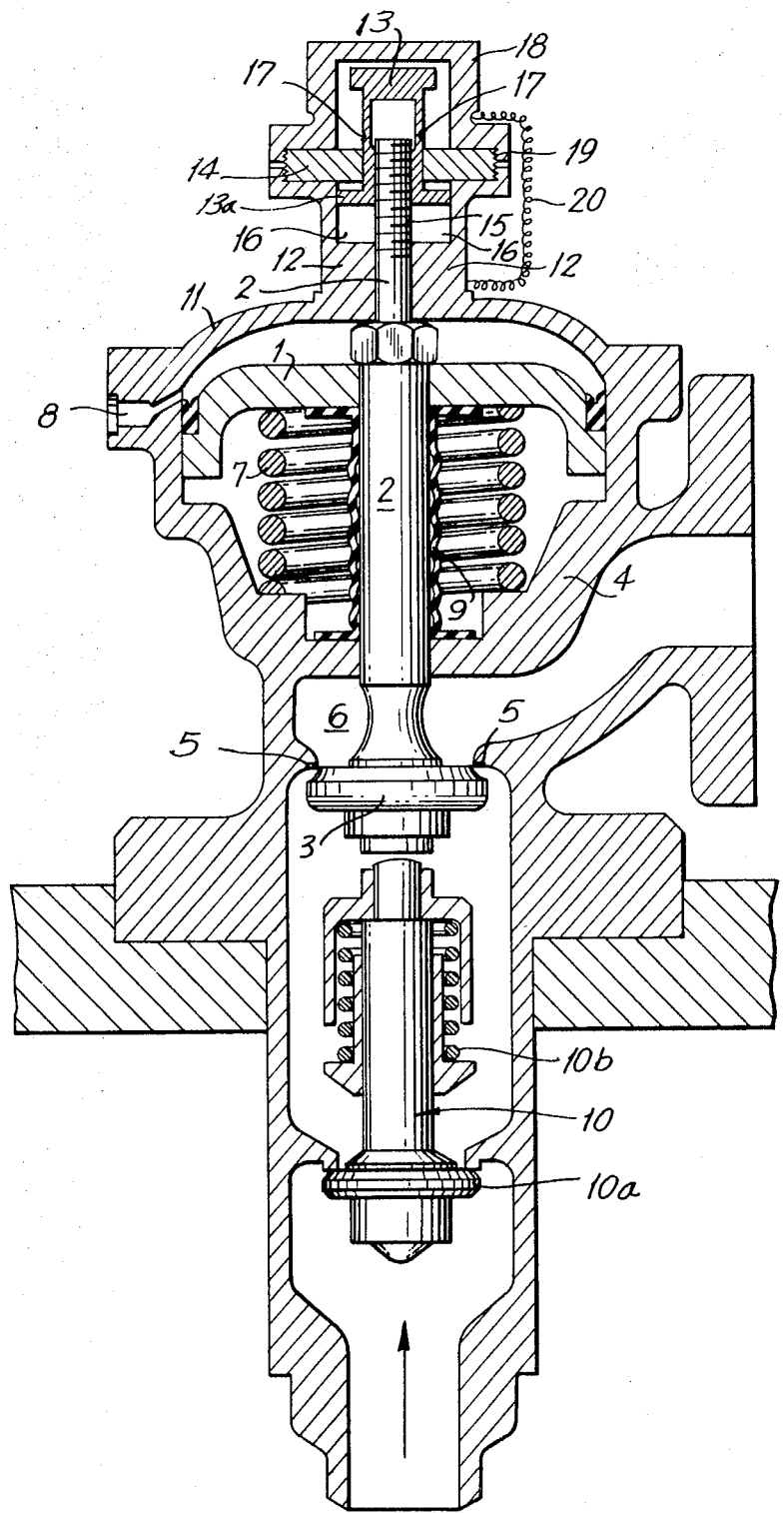
FIG. 1 is a sectional view of a fill and discharge valve with auxiliary hand operation in combination with a cone nonreturn valve, all in the closed position.

According to FIG. 1 the valve combination comprises a fill and discharge valve which is constituted by a plunger 1, a valve stem 2 and a valve member 3, all inside a valve cylinder or housing 4 which contains a valve seat 5 and a valve chamber 6 for supply and discharge of material. Plunger 1 with valve stem 2 and valve member 3 can be displaced against the opposition of a locking spring 7 to open the valve. A bellows 9 seals valve stem 2. A back pressure valve 10, conventionally composed of a valve member 10a and a locking spring 10b, completes the valve combination, which can, for example, be screwed onto the bottom of a dome on a tank car. Normally the back pressure valve is closed by the action of spring 10b and the fill and discharge valve is closed by the action of spring 7.

According to the invention the fill and discharge valve has a manual control supported in a union 12 cast integrally on cap 11 of the valve cylinder 4. The manual control comprises a spindle nut 13 guided in a checkring 14 screwed onto union 12, and having a flange 13a traveling inside a chamber 16 formed by union 12 and checkring 14. The nut 13 threadably engages threaded portion 15 of the valve stem 2 which extends into chamber 16.

The fill and discharge valve can be opened by supply of compressed air to inlet 8 which displaces plunger 1 and the valve stem 2 whereby valve member 3 is lifted from valve seat 5, until the spindle nut 13 contacts the bottom of the inside chamber 16. The stem 2 has a projecting portion beneath valve member 3 which contacts valve 10 when the fill and discharge valve is opened to cause the valve 10 to open whereby the material in the tank car can flow past open valve 10 and open valve member 3 into chamber 6 for discharge. If the valves are closed, plunger 1 and valve stem 2 are displaced outwards and valve member 3 is applied against valve seat 5, and valve member 10a against its seat as shown in FIG. 1. The spindle nut 13 then normally occupies the position shown in FIG. 1.

If the spindle nut 13 on threaded portion 15 of valve stem 2 is now screwed sufficiently far into the inside chamber 16 that it contacts the bottom of this chamber, the valve stem is locked and the valve is secured and cannot be opened. In this last-described position, the valve cannot therefore leak and release gas.

On the other hand the valve can be opened manually by means of the same spindle nut 13 and closed again afterwards. For this purpose the spindle nut 13 is screwed upwardly on threaded portion 15 of valve stem 2, until the flange of nut 13 contacts checkring 14. As the valve stem 2 and the plunger 1 are secured against twisting, further turning of the spindle nut 13 will displace the stem 2 and plunger 1 downwardly in valve cylinder 4, and the valves are then opened.

It is expeditious to provide an index mark, e.g. a circumferential notch 17 or the like on the outside of the spindle nut. The notch 17 is intended to facilitate recognition that the valve is closed under the force of spring 7 and secured in the closed position by the contact of the flange of the spindle nut 13 with the bottom of chamber 16.

For practical purposes, the spindle nut 13 has a square head so that the spindle nut can be turned with a wrench.

To protect the spindle nut 13 against outside damage and especially against unauthorized changes of the setting of spindle nut 13, a protective cap 18 is threadably engaged on a thread 19 on checkring 14 to cover nut 13. This protective cap 18 can be nonremovably secured to union 12 by means of a chain 20 or like connection.

Figure 2:
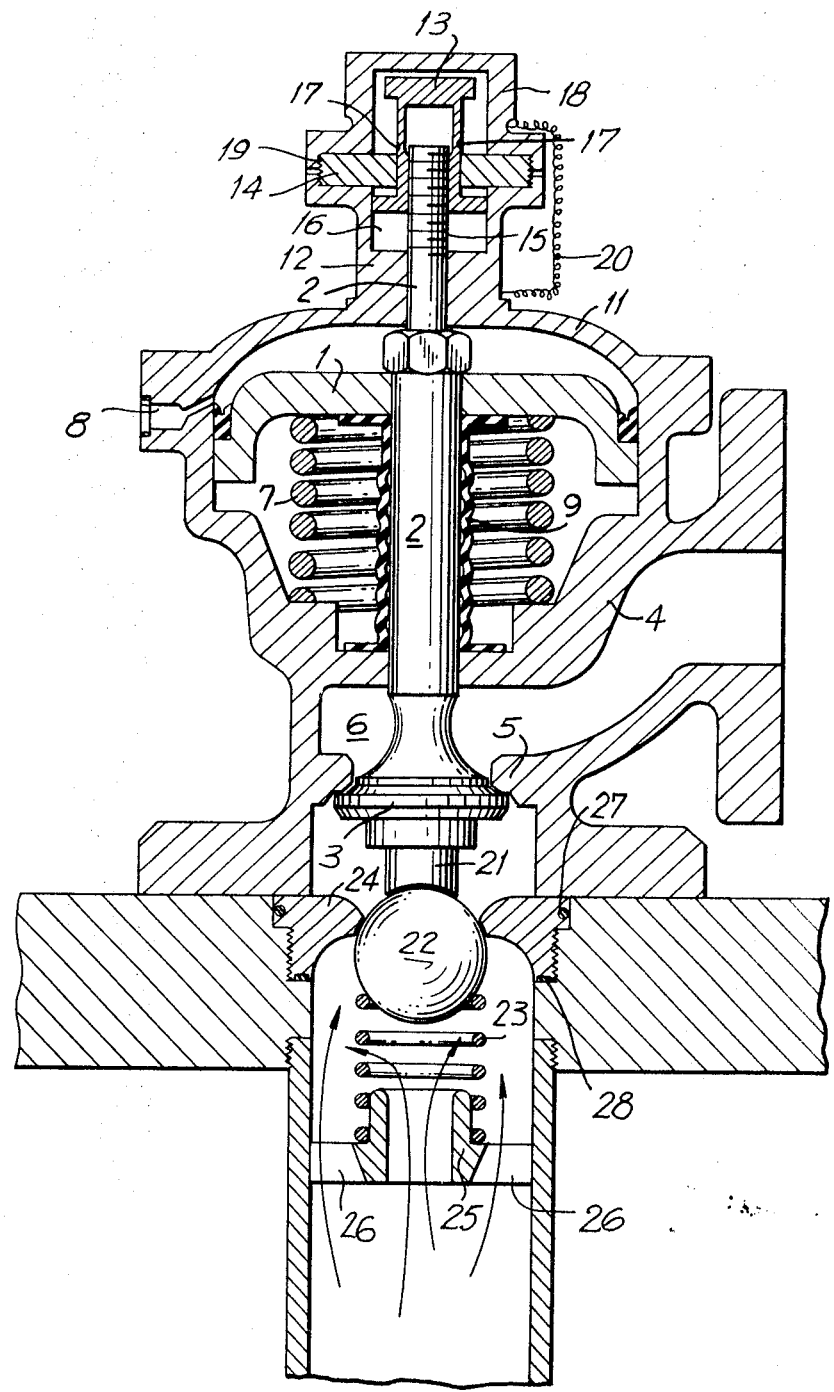
FIG. 2 is a sectional view of a fill and discharge valve with auxiliary hand operation in combination with a ball retaining valve, all similarly in the closed position.

According to another embodiment of the invention, the fill and discharge valve with manual operation as described above is combined with a back pressure valve constituted as a ball retaining valve as shown in FIG. 2. In this FIG., those elements which are the same as the elements in FIG. 1 have been given the same reference numerals and will not be described further. The fill and discharge valve, which can be opened by compressed air or manually by means of spindle nut 13, is shown in its closed position as is also the back pressure valve.

This means that valve member 3 is pressed firmly against valve seat 5. The valve member 3 in this case is prolonged by a neck 21, with a concave face to match the surface of a ball 22.

The back pressure valve in this case comprises the ball 22 which is pressed against the valve seat 24 by a compression spring 23. Spring 23 is mounted on the central boss 25 of a perforated disc 26 which can be, for example, in the form of a spoked wheel.

Valve seat 24 is constituted as a cylindrical member screwed into the container wall, for example the bottom of the dome of a tank car, and can be sealed tight therewith by a circular ring 27 and a gasket 28. The top of the cylindrical member with valve seat 24 can have a bore for the insertion of a socket wrench.

For reasons of safety, it is advisable to leave a clearance of several millimeters between the fill and discharge valve in its closed position and the back pressure valve in its closed position. Namely, surface 21 is spaced several millimeters from ball 21 when valve member 3 is on seat 5 and ball 22 is on seat 24. The fill and discharge valve can have a total displacement of 12 mm. and be spaced by 2 mm. from the back pressure valve in the closed position, so that only after traversing this safety clearance of 2 mm. does the neck 21 of the valve stem 2 engage ball 22 and whereafter the two valves traverse a common inlet path of 10 mm. (12 mm. minus 2 mm.).

The ball can be made of any desired suitable material. With corrosive liquids, it is desirable to use for this purpose a durable corrosionproof plastic such as Teflon.

It is seen from the above that the invention provides on a tank car or similar vessel the combination of a fill and discharge valve with a normally closed back pressure valve, wherein the fill and discharge valve is associated with means for automatically opening and closing the same whereas the back pressure valve is opened by the fill and discharge valve when the latter is opened whereby the tank car can be filled or emptied, said fill and discharge valve further being associated with manually operable means to secure the fill and discharge valve in the closed position to prevent opening thereof by the automatic means and to open the fill and discharge means independently of the automatic means.

I claim:

1. For use on a vessel, the combination of a fill and discharge valve and a normally closed back pressure valve, said fill and discharge valve having open and closed positions and including means for automatically moving the fill and discharge valve between said open and closed position, and means for opening said back pressure valve when the fill and discharge valve is opened; and manually operable means engaged with said fill and discharge valve to secure said fill and discharge valve in the closed position and prevent opening thereof by said first means and to open said fill and discharge valve independently of said first means.

2. The combination as claimed in claim 1 comprising a common housing for said fill and discharge valve and said back pressure valve.

3. The combination as claimed in claim 1 wherein said fill and discharge valve comprises a movable stem, a valve member on said stem, and a plunger on said stem, said means for automatically moving the fill and discharge valve comprising a chamber in said housing adapted for receiving a pressure fluid to act on said plunger and displace said stem and the valve member therewith.

4. The combination as claimed in claim 1 comprising a housing for said fill and discharge valve, said fill and discharge valve comprising a movable stem and a valve member on said stem for the opening and closing of the fill and discharge valve, a checkring of said housing, and a spindle nut threadably mounted on said stem and displaceable thereon between a first limit position in engagement with said housing and a second limit position in engagement with said checkring.

5. The combination as claimed in claim 4 comprising a protective cap detachably on said checkring for enclosing said spindle nut.

6. The combination as claimed in claim 5 wherein said spindle nut includes a portion guidably extending in said checkring and therebeyond with a head on said portion.

7. The combination as claimed in claim 6 wherein said portion of the spindle nut extending beyond said checkring comprises indicia means for indicating the closed position of said fill and discharge valve.

8. The combination as claimed in claim 1 wherein said back pressure valve comprises a ball, and spring means acting on said ball to urge the ball to the normally closed position of the back pressure valve, said means for opening the back pressure valve comprising a neck portion on said fill and discharge valve for engaging said ball when the latter valve is opened to displace said ball against the opposition of said spring means and open the back pressure valve.

9. The combination as claimed in claim 8 wherein said neck portion has a concave face facing said ball and conforming to the curvature thereof.

10. The combination as claimed in claim 8 wherein said neck portion has a safety clearance with said ball when the fill and discharge valve and the back pressure valve are both closed.

11. The combination as claimed in claim 1 wherein said back pressure valve comprises a spring-loaded valve member adjacent said fill and discharge valve for being displaced thereby.